G. A. WALKER.
Paper-Cutting Machines.
No. 5,463. Reissued June 24, 1873.
1.
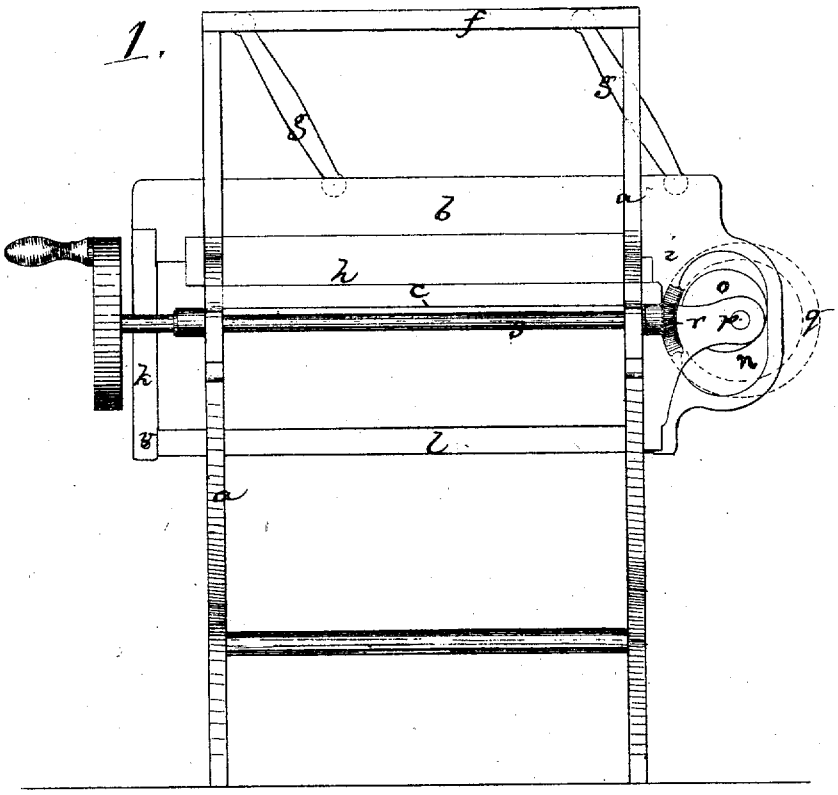
2.
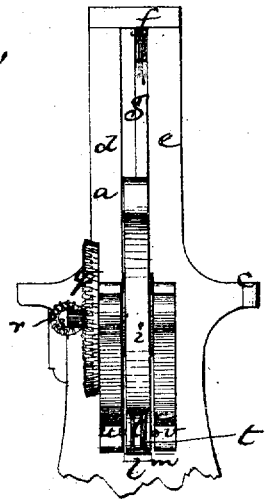
Witnesses.
M. W. Frothingham
L. H. Latimer
G. A. Walker
By his Attys.
Crosby & Gould
AM. PHOTO-LITHOGRAPHIC CO. N.Y. (OSBORNE'S PROCESS.)

UNITED STATES PATENT OFFICE.

GEORGE A. WALKER, OF BOSTON, MASSACHUSETTS, ASSIGNOR TO WM. G. ELY, OF NORWICH, CONNECTICUT.

IMPROVEMENT IN PAPER-CUTTING MACHINES.

Specification forming part of Letters Patent No. 118,308, dated August 22, 1871; reissue No. 5,463, dated June 24, 1873; application filed May 31, 1873.

*To all whom it may concern:*

Be it known that I, GEORGE A. WALKER, of Boston, in the county of Suffolk and State of Massachusetts, have invented an Improved Paper-Cutting Machine; and I do hereby declare that the following, taken in connection with the drawing which accompanies and forms part of this specification, is a description of my invention sufficient to enable those skilled in the art to practice it.

My invention relates to the arrangement of the mechanism and the method of operating the knife of that class of paper-cutting machines in which the cutter-bar or stock moves vertically between suitable ways or guides, and has a downward-inclined vertical movement for its cutting-stroke.

The drawing represents a front view of a machine embodying my invention, and an end view of the cutter-frame and guides.

*a* denotes the frame of the machine; *b*, the knife-stock; *c*, the table upon which the paper is supported. Over this table, at each end of it, are uprights *d e*, between which the knife-bar or stock *b* reciprocates, and by which it is guided, the stock being hung from a cross-beam or head, *f*, by links *g g*. *h* denotes the knife fixed to the stock in the ordinary manner. From the opposite ends of the stock (outside of the frame *a*) two vertical bars, *i k*, depend, and the lower ends of these bars are connected by a rail, *l*, which runs through vertical slots *m* in the opposite uprights of the frame *a*, the stock *b*, bars *i k*, and rail *l* constituting a cutter-frame which, with the guiding-surfaces, insure correct vertical movement of the knife. At one end of this frame is an oblong slot, *n*, in which rotates an eccentric, *o*, on a shaft, *p*, and the rotation of this eccentric imparts a quick movement to the cutter as it first descends, and a slow but powerful downward and longitudinal movement to it as it cuts through the paper. The eccentric may be rotated by any suitable mechanism, that shown being a bevel-gear, *q*, on the shaft *p*, and a bevel-pinion, *r*, on a driving-shaft, *s*. The slotted frame may be driven by a crank operating on a sliding box reciprocating vertically in the slot *n*, but I prefer the employment of the eccentric.

It will be observed that in this organization the eccentrics operate only in connection with the pendent links to which the cutter-bar is suspended, the bar being thrown forward by the eccentrics, and working downward as thrown forward simply and only because the links prevent such forward movement without conjoint downward movement, the slot permitting free vertical movement of the cutter-bar with relation to the eccentric, and the eccentric effecting the differential forward movement of the cutter-bar for its most effectual operation, as described. The arrangement of the links *g g*, slot and eccentric, not only insure the most effectual movement of the cutter-bar, but also a freedom of movement of both the bar and the eccentric not otherwise attainable.

The machine thus constructed or organized is very simple, effective, and enduring, and may be kept in perfect running order at but very slight expense, and without liability to breakage or necessity of repairing. The lower end of the bar *i* is slotted, and the end of the rail *l* extends through the slot *t*, the bar *i* being confined in position by screws *u v*. The slot is wider than the thickness of the end of the rail, and, by means of the screws, the bar *i*, and thereby the knife-stock, may be adjusted to keep the straight side of the cutter close up to the uprights *d d*, so that it shall cut in a true plane.

I claim—

1. In combination with the cutter-bar *b*, and with the links *g g* for suspending it and controlling its movement, the eccentric *o* and slot *n*, the whole being constructed and arranged to operate substantially as shown and described.

2. The cutter-frame, guided as shown and described, and having the cutter-stock adjustable by means of the adjusting-screws *u v*, or their equivalent, substantially as shown and described.

GEORGE A. WALKER.

Witnesses:

FRANCIS GOULD,

M. W. FROTHINGHAM.